United States Patent
Sookprasong et al.

(10) Patent No.: US 9,490,648 B2
(45) Date of Patent: Nov. 8, 2016

(54) ALTERNATING CURRENT DIRECT CURRENT ADAPTER WITH WIRELESS CHARGING

(75) Inventors: Jamie Sookprasong, Houston, TX (US); Lee Warren Atkinson, Houston, TX (US); Edgar Diego Haren, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 551 days.

(21) Appl. No.: 13/460,138

(22) Filed: Apr. 30, 2012

(65) Prior Publication Data

US 2013/0285601 A1    Oct. 31, 2013

(51) Int. Cl.
*H02J 7/00* (2006.01)
*H02J 7/02* (2016.01)

(52) U.S. Cl.
CPC .......... *H02J 7/025* (2013.01); *H02J 2007/006* (2013.01); *H02J 2007/0062* (2013.01)

(58) Field of Classification Search
CPC .... H05B 37/0272; H02J 7/025; H02J 5/005; H02J 7/0055
USPC .......................................................... 320/108
See application file for complete search history.

(56) References Cited

U.S. PATENT DOCUMENTS

| | | | |
|---|---|---|---|
| 5,734,254 A | 3/1998 | Stephens | |
| 6,122,181 A * | 9/2000 | Oughton, Jr. | 363/37 |
| 6,236,226 B1 * | 5/2001 | Hagiwara | 324/764.01 |
| 6,255,800 B1 | 7/2001 | Bork | |
| 6,329,792 B1 * | 12/2001 | Dunn et al. | 320/132 |
| 7,898,215 B2 | 3/2011 | Nagatsuka et al. | |
| 8,058,749 B2 * | 11/2011 | Radun | 307/64 |
| 8,286,006 B2 * | 10/2012 | Kreiner et al. | 713/300 |
| 8,487,481 B2 * | 7/2013 | Cook et al. | 307/104 |
| 2004/0194387 A1 * | 10/2004 | Hom et al. | 49/49 |
| 2007/0182368 A1 * | 8/2007 | Yang | 320/110 |
| 2007/0287394 A1 * | 12/2007 | Swan et al. | 455/127.5 |
| 2008/0197801 A1 * | 8/2008 | Manor et al. | 320/103 |
| 2008/0265836 A1 | 10/2008 | Inoue et al. | |
| 2009/0001938 A1 * | 1/2009 | Vantu et al. | 320/165 |
| 2009/0278494 A1 * | 11/2009 | Randall | 320/114 |
| 2009/0284022 A1 * | 11/2009 | Usselman et al. | 290/38 R |
| 2010/0001685 A1 * | 1/2010 | Eastlack | 320/108 |
| 2010/0084918 A1 * | 4/2010 | Fells et al. | 307/32 |
| 2010/0109443 A1 * | 5/2010 | Cook et al. | 307/104 |
| 2010/0164433 A1 * | 7/2010 | Janefalkar et al. | 320/115 |
| 2010/0276992 A1 * | 11/2010 | Radun | 307/9.1 |
| 2011/0018360 A1 * | 1/2011 | Baarman et al. | 307/104 |
| 2011/0050447 A1 * | 3/2011 | Tedesco | 340/687 |
| 2011/0133560 A1 * | 6/2011 | Yamashita et al. | 307/66 |
| 2011/0181235 A1 | 7/2011 | Walley et al. | |
| 2011/0241429 A1 * | 10/2011 | Whitmore | 307/66 |
| 2012/0126956 A1 * | 5/2012 | Trzecieski et al. | 340/12.5 |
| 2013/0026983 A1 * | 1/2013 | Yamamoto et al. | 320/108 |
| 2013/0093381 A1 * | 4/2013 | McGinley et al. | 320/107 |
| 2013/0113421 A1 * | 5/2013 | Han et al. | 320/108 |
| 2013/0187596 A1 * | 7/2013 | Eastlack | 320/108 |

(Continued)

FOREIGN PATENT DOCUMENTS

CN    201126972    10/2008

*Primary Examiner* — Suchin Parihar
(74) *Attorney, Agent, or Firm* — HP Inc. Patent Department (57) ABSTRACT

A charging device that includes an alternating current (AC) direct current (DC) adapter and a wireless charger. In one implementation the charging device combines an AC/DC adapter and a wireless charger into a same housing.

10 Claims, 5 Drawing Sheets

(56) References Cited

U.S. PATENT DOCUMENTS

| | | | |
|---|---|---|---|
| 2013/0222991 A1* | 8/2013 | McWilliams | 361/679.4 |
| 2013/0314034 A1* | 11/2013 | Ang | 320/107 |
| 2013/0335223 A1* | 12/2013 | Brown et al. | 340/568.1 |
| 2014/0006807 A1* | 1/2014 | Oglesby et al. | 713/300 |
| 2014/0009120 A1* | 1/2014 | Kim | 320/138 |
| 2014/0245036 A1* | 8/2014 | Oishi | 713/300 |
| 2014/0320076 A1* | 10/2014 | Kwon et al. | 320/108 |
| 2015/0077038 A1* | 3/2015 | Chao et al. | 320/103 |
| 2015/0194834 A1* | 7/2015 | Lee | 320/108 |
| 2015/0256017 A1* | 9/2015 | Hays et al. | 320/108 |
| 2015/0263530 A1* | 9/2015 | Tsuda et al. | 320/108 |

* cited by examiner

ALTERNATING CURRENT DIRECT CURRENT ADAPTER WITH WIRELESS CHARGING

BACKGROUND

Devices such as portable computers, cellular phones, tablet PCs, and MP3 players for example, generally require charging of an internal power source, such as a battery. Given the wide variety of devices and various charging requirements of the respective devices, an individual may be become overburdened with a plurality of different charging apparatuses and power cords for connecting to the various charging apparatuses. Although wireless charging eliminates the need for multiple power cords, a user may still be required to carry alternative charging apparatuses for devices that do not accommodate wireless charging.

DETAILED DESCRIPTION

One or more implementations of the present disclosure are described with reference to the attached drawings, wherein like reference numerals are used to refer to like elements throughout. Disclosed is a charging device that can wirelessly provide energy to a remote device via electromagnetic induction at a charging surface of the device and/or via a wired connection between the charging device and a remote device. Therefore, the charging device can accommodate a variety of devices having different charging needs and energy storage mechanisms while reducing the amount of different hardware (e.g. cords and apparatuses) needed to charge a plurality of devices.

In an aspect, the charging device is an alternating current (AC) to direct current (DC) adapter having a wireless charging pad on a surface thereof. The charging device has an AC cable for receiving AC input from an external power source and a DC cable for providing DC output to a device (e.g. a laptop). In an aspect, when the AC cable is disconnected from an external power source, the charging device can receive DC input from a device (e.g. laptop battery) connected to the charging device via the DC cable. The DC input can be used by the charging device for the wireless charging mechanism of the charging device.

Figure 1:
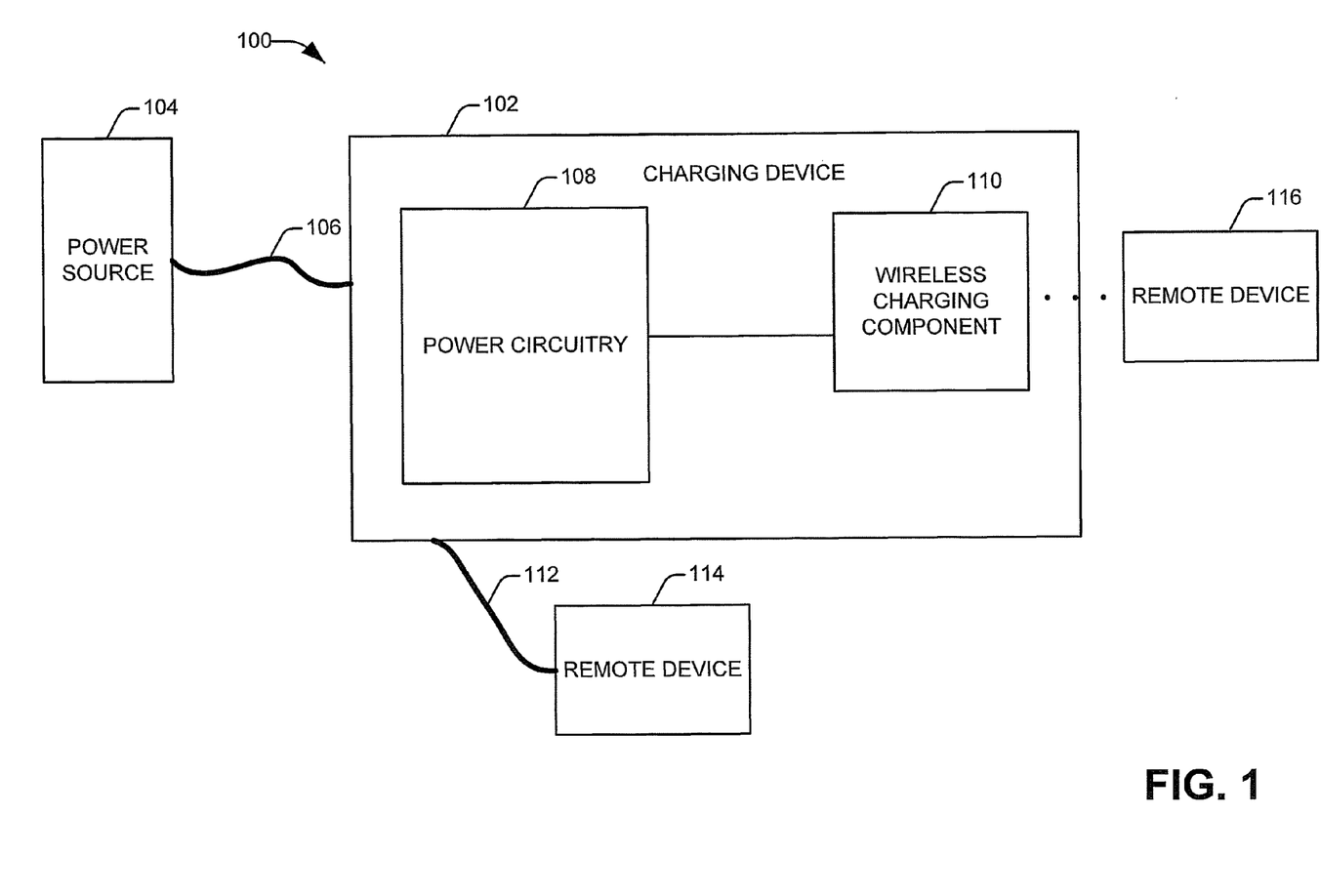
FIG. 1 illustrates a high level block diagram of a charging system employing a charging device having wired and wireless charging capabilities.

Referring now to FIG. 1, illustrated is an exemplary high level block diagram of a charging/power system 100 for providing energy or power to remote devices. System 100 can include a charging device 102, a power source 104, and one or more remote devices 114 and 116. Charging device 102 is configured to function as an AC/DC power adapter in one aspect, a wireless charger in another aspect, and both an AC/DC power adapter and a wireless charger in yet another aspect.

Charging device 102 is configured to provide power or energy to remote devices in a variety of manners. Charging device 102 can wirelessly provide energy to a remote device via electromagnetic induction and/or via a wired connection between the charging device and remote device. Therefore, charging device 102 can accommodate a variety of devices having different charging needs and energy storage mechanisms. Remote devices capable of employing charging device can include any electronic device capable of receiving energy or power. In an aspect, the remote electronic device can further store received energy or power in a suitable charge storage device. For example, remote devices can employ a battery, a' battery having a plurality of cells, or other energy storage device in order to store energy, such as a fuel cell or capacitor, for example. Example remote devices that may employ charging device 102 can include, but are not limited to, personal computers, server computers, hand-held or laptop devices, tablets, mobile devices (such as mobile phones, Personal Digital Assistants (PDAs), iPads, iPods, Mp3 players, media players, and the like), or any consumer electronic, for example, and the like.

Charging device 102 can include an AC cable 106 for receiving AC power input from a power source 104 and power circuitry 108 for converting the AC power input into DC power output. Charging device 102 can further employ the DC power output to provide energy to remote devices. In an aspect, the charging device 102 can include a DC cable 112 for providing the DC power output to a device 114 (e.g. a laptop computer) connected thereto. In another aspect, the charging device 102 can employ the DC power output to provide power to a wireless charging component 110. In turn, the wireless charging component 110 can wirelessly provide power to a device 116 (e.g. a cellular phone) engaged with the wireless charging component.

It should be appreciated that charging device 102 can provide power to multiple devices at the same time or a single device at time. For example, charging device 102 can charge a laptop computer via DC cable 112 and a cellular phone via wireless charging component 110. Further, charging device 102 may only provide power to a device via wireless charging component 110 or the DC cable 112 at a given time. In addition, it should be appreciated that a single device can employ the multiple charging mechanisms of charging device 102 based on the device's functionality. For example, a device having wireless charging capability and a DC input port may be charged by charging device from either the DC cable or the wireless charging component 110.

The AC cable 106 is used to connect the charging device 102 to a power source 104. For example, the AC cable can include a plug which engages an AC external power source outlet. In an aspect, the charging device 102 receives commercial AC power from the power source 104 when connected thereto, converts the AC power into a certain DC voltage via power circuitry 108, and supplies the DC voltage to a device connected to the DC cable.

Charging device 102 can be configured to receive any amount of AC power voltage and convert the received AC voltage into a DC voltage suitable for powering external devices. In an aspect, charging device 102 receives a commercial AC power supply of between 100-240 Volts (V), and converts the AC power supply into a DC voltage of between 12V-24V, or between 50-230 Watts. In another aspect, charging device 102 receives a commercial AC power supply of between 110-220 Volts (V), and converts the AC power supply into a DC voltage of between 14V-20V, or between 75-150 Watts. In yet another aspect, charging device 102 receives a commercial AC power supply of between 110-220 Volts (V), and converts the AC power supply into a DC voltage of between 16V-19.5V, or between 90-100 Watts.

The charging device 102 can further provide the DC power output to at least a remote device 114 (e.g. a notebook computer) via DC cord 112. In an aspect, the charging device 102 provides the remote device 114 with substantially all the DC power output generated from the AC power input via the power circuitry 108. In another aspect, the charging device 102 provides the remote device 114 (via the DC cable) a portion of the DC power output generated from the AC power input via the power circuitry 108. For example, the charging device 102 can provide the remote device a portion of the DC power output when the remote device 114 is connected to the DC cable. In an aspect, where the DC power output is 19.5 Volts and/or 100 Watts, the portion of the DC power output provided to the device 114 can include 90 Watts. The charging device 102 can further provide a portion of the DC power output to the wireless charging component 110. For example, where the DC power output is 19.5 Volts and/or 100 Watts, the portion of the DC power output to the wireless charging component 110 can include 90 Watts. It should be appreciated that the above distributions of DC power output are not intended to limit the subject disclose.

Power circuitry 108 can include any suitable components for converting AC power input into DC power output as well as for distributing the DC power output (and DC power input as discussed infra) to the devices connected to the power charging device 102 (via one or more ports, the DC cable, and the wireless charging component). An AC powered unregulated power supply 104 can employ a transformer to convert voltage from a wall outlet (mains) to a different lower DC voltage. Power circuitry can employ rectifier to convert AC voltage to a pulsating DC voltage, followed by a filter having one or more capacitors, resistors, and/or inductors to filter out or smooth the pulsation.

For example, in an aspect, power circuitry 108 can include a input unit, a power transistor, a transformer, an output unit, a feedback unit, and a driver. The input unit can receive AC power input via the AC cable. The input unit can convert the AC power supply into a DC voltage through an LC filter of one or more capacitors, an inductance, a bridge diode, and a smoothing capacitor, and supply the DC voltage to a primary coil of the transformer. If the power transistor repeatedly switches on and off based on a pulse width modulation (PWM) control signal input from the driver, an induced electromotive force from the primary coil to the secondary coil of the transformer is generated. An AC voltage output from the secondary coil of the transformer is converted into a certain DC voltage (e.g. 19.5V) through a rectifying diode and a smoothing capacitor of the output unit.

Wireless charging component 110 is also configured to receive DC power output (and DC power input discussed supra) in order to facilitate wireless charging of a remote device 116. Wireless charging component 110 can utilize electromagnetic induction and/or other suitable techniques for wirelessly providing power to one or more remote electronic devices. In one example, the charging device 102 can have one or more designated charging surfaces that are equipped for providing power to electronic devices engaged thereto. These charging surfaces can, for example, utilize one or more wires or coils (e.g. located within a housing of the charging device 102) through which a current can be passed to generate a magnetic field. The magnetic field can be controlled by wireless charging component 110 to extend to a predetermined inductive range from the charging surface, thereby allowing one or more remote electronic devices 116 to leverage the magnetic field to obtain power from the charging surface.

In accordance with an embodiment, charging component 110 can enable wireless charging if one or more predetermined conditions are met. For example, the charging component 110 can enable charging upon a determination that a charging surface located on the charging device 102 is engageable or engaged by one or more to-be-charged remote devices 116. This determination can be made by, for example, be determining if a device 116 is brought within an inductive range of the charging device 102. The inductive range of charging device 102 is a preconfigured parameter as a function of the hardware employed by wireless charging component 110 and/or the hardware affiliated in a remote device 116 that is to be wirelessly charged by charging device 102. In an aspect, the inductive range requires remote device 16 to be touching charging device 102. In another aspect, the inductive range requires a remote device 116 to be within 0.1 to 300 mm.

A remote device 116 to be charged by the wireless charging component 110 can be equipped with a power receiver, which can comprise an inductor and/or other components operable to obtain power from the charging device 102 via electromagnetic emissions from the charging component 110. In an aspect, the wireless charging component 102 can determine that a remote device is engaged with charging device for wireless charging by detecting resonance at a charging inductor (e.g. a primary coil) and an associated capacitor of the wireless charging component 110. This can be accomplished by, for example, measuring voltage across the capacitor. For example, the wireless charging component can include a charging inductor and a capacitor, and be configured to not resonate when a power receiver coil in a remote device 116 to be charged is not present.

In accordance with another aspect, if a power receiver coil associated with a remote device 116 is found to be placed a charging surface of charging device 102 or otherwise within the inductive range of the wireless charging component 110, the wireless charging component 110 can enter a charging mode. In an aspect, in order to provide energy to wirelessly charge a remote device 116, the wireless charging component can include a DC power input unit, a MOSFET driver, a MOSFET push-pull switching circuit, and an inductor coil. For example, when in the charging mode, the wireless charging component 110 can receive at the input unit, DC power output generated by the power circuitry 108 (or DC power input). The wireless charging component 110 can further control the MOSFET driver, which in turn can drive the MOSFET push-pull switching circuit to facilitate the generation of a periodically-varying inductive current through the charging inductor coil. In one example, the variance in the current across the charging inductor coil can cause a magnetic field to be emitted by the wireless charging component (e.g. via a charging surface of the charging device 102), which can in turn induce an electrical current at a power receiver coil of a receiving electronic device 116 located within the magnetic field.

In an aspect a rectifier coupled to the power receiver coil in a receiving device 116 can then be utilized to convert the periodically-varying inductor current to a direct current (DC) signal. The receiving device 116 can utilize a DC/DC regulator to process the DC signal from the rectifier, and a charging circuit can utilize the regulated DC signal to charge a battery and/or another appropriate electrical storage means at an associated electronic device 116.

Figure 2:
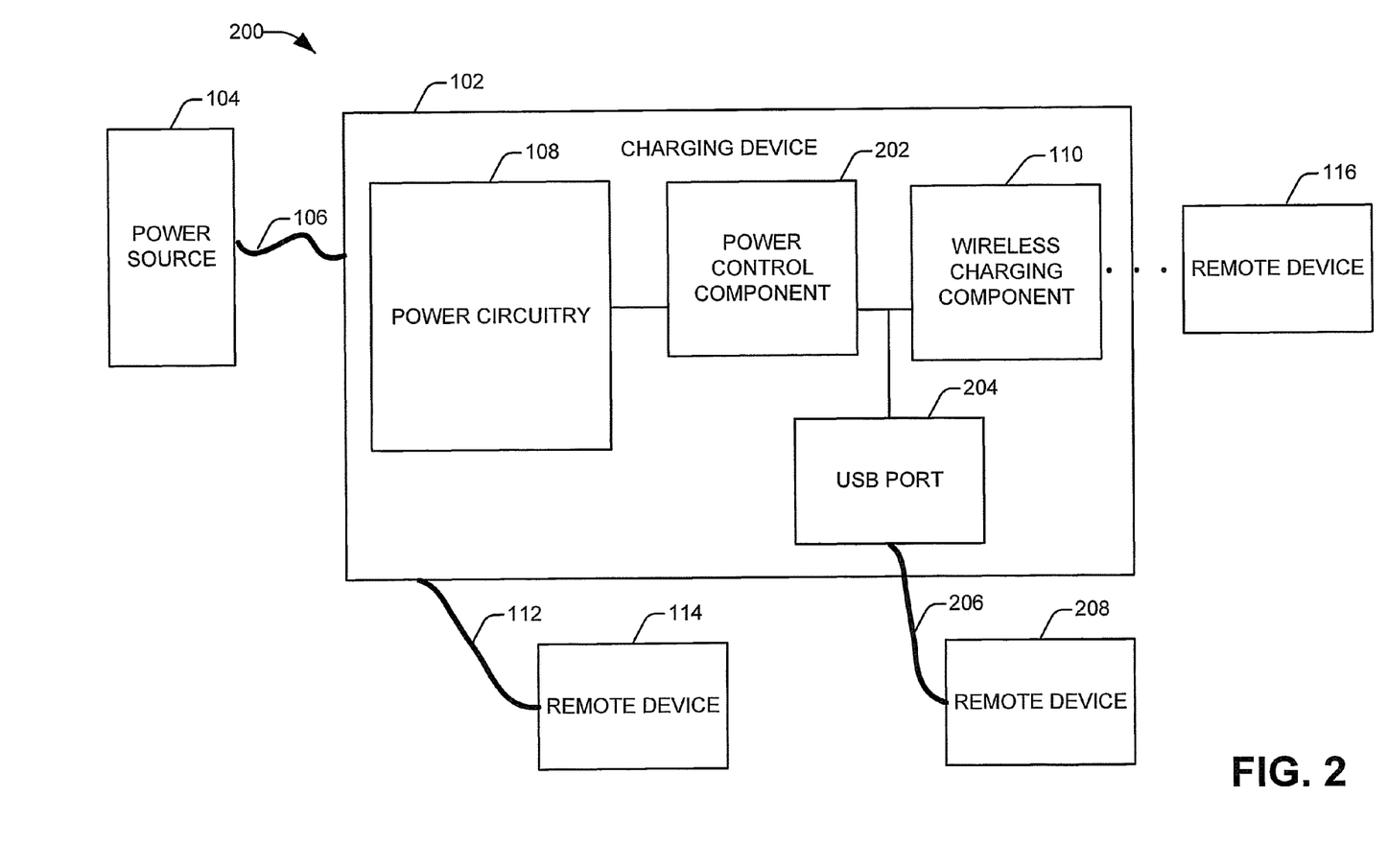
FIG. 2 illustrates another high level block diagram of a charging system employing a charging device having wired and wireless charging capabilities.

Referring now to FIG. 2, illustrated is another exemplary block diagram of a charging/power system 200 for providing energy or power to remote devices. System 200 can include one or more of the components of system 100 with the addition of power control component 202, universal serial bus port 204, connector cable 206, and remote device 208.

In an embodiment, power control component 110 is configured to control the input and output of energy to and from charging device 102. For example, as discussed infra, charging device 102 can provide DC output power to a device via the DC cable 112 and to a device via the wireless charging component 110. The power control component 202 can distribute DC power output from the power circuitry to the DC cable 112 and the wireless charging component in accordance with a predefined power distribution protocol. Further, in an embodiment, charging device 102 can also comprise one or more universal serial bus ports (USB) ports 204. Charging device 102 is thus configured to provide power to a device connected to the charging device via the one or more USB ports 204 (using a connector cable 206). Therefore, power control component 202 is also configured to control the distribution of DC power output to the one or more USB ports.

According to an embodiment, the power control component 202 distributes DC power output by power circuitry 108 to each of the power outlets of the charging device (wherein the power outlets include the DC cable 112, the wireless charging component 110, and the one or more USB ports 204) as a function of a predefined power distribution protocol. In an aspect, the power distribution protocol instructs the power control component 202 to distribute a first amount of DC power output to the DC cable, a second amount of the DC power output to the wireless charging component, and a third amount of the DC power output to the one or more USB ports (divided evenly when two or more ports). For example, the first amount of the DC power output can be from about 80 Watts to about 100 Watts, the second amount of the DC power output can be from about 1 Watt to about 10 Watts, and the third amount of the DC power output can be from about 1 Watt to about 10 Watts. In another example, the first amount of the DC power output can be from about 85 Watts to about 95 Watts, the second amount of the DC power output can be from about 3 Watts to about 7 Watts, and the third amount of the DC power output can be from about 3 Watts to about 7 Watts.

The power distribution protocol can further instruct the power control component 202 to distribute a first amount of DC power output to the DC cable, a second amount of the DC power output to the wireless charging component, and a third amount of the DC power to the one or more USB ports (divided evenly when two or more ports) as a function of the amount of the DC power output provided to any of the DC power outlets. In other words, the power distribution protocol can define a relationship between the DC power outlets such that an amount of energy applied to a one of the DC power outlets of the charging device is dependent on an amount of energy applied to another one of the DC power outlets. For example, the first amount of the DC power output can be from about 80 Watts to about 100 Watts, if a device is not engaged with the wireless charging component 110 and the first amount of the DC power output can be from about 85 Watts to about 95 Watts, if a device is engaged with the wireless charging component 110. In another example, the second amount of the DC power output can be from about 3 to 5 Watts if a device is not connected to the DC power cable and from about 5 to 10 Watts if a device is connected to the power cable. It should be appreciated that a variety of power distribution protocols can be employed by power control component to control the distribution of DC power output as a function of a number of devices connected to the charging device 102, a manner in which the devices are connected to the charging device 102, and a type of device connected the charging device.

In another aspect, the power control component 202 can be configured to control the distribution of DC power output from the power circuitry 108 as a function of device connection or engagement with the charging device 102. According to this aspect, the charging device 102 can limit distribution of the DC power output to DC power outlets of the charging device 102 only when devices are engaged therewith. For example, the power control component 202 may receive a signal from the wireless charging component 110 indicating that a device is not within inductive range of the wireless charging component 110. As a result, the power control component 202 can channel the DC power output to an outlet having a device engaged therewith such as the DC cable 112 and/or a USB port 204, if devices are engaged therewith.

In an embodiment, the power control component 202 is further configured to send a request for power in response to disconnection of the AC cable from the power source or when the charging device does not receive power input from the AC cable. When the charging device ceases receiving AC power input and a device 114 is connected to the charging device via the DC cable, the power control component 202 can send a request to the device via the DC cable for power. In response, the device 114 (e.g. a notebook computer) can transmit power, such as DC power from a battery associated with the device, to the charging device 102. In turn, the charging device can employ the DC power input to power the wireless charging component 110 and/or one or more USB ports 204. As a result, the charging device 102 can charge a device 116 via the wireless charging component 110 when the charging device is disconnected from an external power source 104. In an aspect, the charging device 102 can receive from about 1 Watt to about 10 Watts of DC power input from a device 116 connected thereto via the DC cable 112.

According to this embodiment, the DC cable 112 can transmit DC power in two directions (e.g. transmit and receive DC power). In an aspect, a device 114 connected to the charging device 102 can detect when the charging device does not provide power (e.g. when the charging device does not receive AC power input). In response the device 114 can output DC power to the charging device 102 through the DC cord. In turn, the DC power can be employed by the charging device 102 to provide power to the wireless charging component 110.

In yet another aspect, the power control component 202 can be configured to direct the DC cable 112 to automatically reverse the direction of DC flow when the charging device 102 does not receive AC power input. In response to disconnection of charging device 102 from an AC power source 104, the power control component 202 can direct the DC cable 112 to reverse the direction of DC flow so that rather than transferring power from the charging device 102 to remote device 114, the DC cable transfers power from the remote device 114 to the charging device 102. In other words, the charging device 102 can receive power from a power source associated with remote device 114, such as a battery associated with remote device 114, when AC power is not available. According to this aspect, the charging device 102 can automatically leech power from a remote device 114 connected to the charging device 102 via the DC cable 112 when the AC cable 106 does not provide AC power input. In turn, the charging device 102 can employ DC power sourced from remote device 114 to facilitate wireless charging of a remote device 116 via wireless charging component 110.

Figure 3:
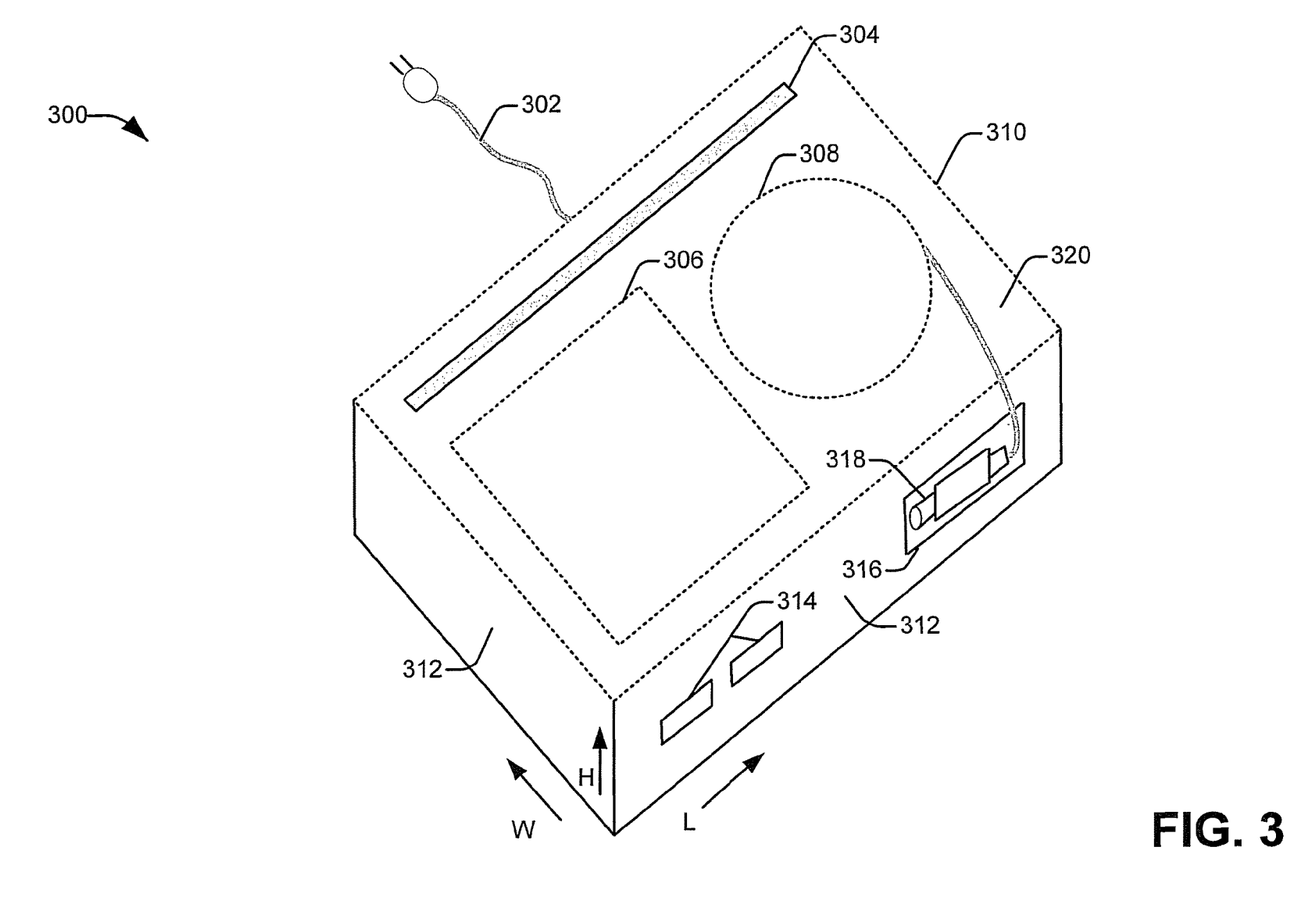
FIG. 3 illustrates a charging device having wired and wireless charging capabilities.

Referring now to FIG. 3, presented is an exemplary embodiment of a charging device 300 in accordance with aspects disclosed herein. Charging device 300 can include one or more of the features of charging device 102 described with respect to systems 100 and 200. Charging device 300 can include a housing 310 comprising a top surface 320, a bottom surface opposite the top surface (not shown), and sides surfaces 312. The housing 310 defines an internal compartment for housing various components of the charging device 300 including at least power circuitry (e.g. power circuitry 108) that converts AC power input to DC power output and an inductive charging component (e.g. wireless charging component 110). In an aspect, the housing is made of a hard plastic resin or metal or combination of both. In an aspect, the plastic and/or metal is fire resistant. The top surface of the housing 320 can include a rubber matt or coating thereon to prevent slippage of devices rested thereon (e.g. devices utilizing the wireless charging mechanism of the charging device 300).

The housing 310 can be any suitable dimension in order to accommodate the various components internal and external components of the charging device 300 yet provide a compact and portable design for the charging device. In an aspect, the charging device has a length (represented by the L arrow), a width (represented by the W arrow), and a height (represented the H arrow) from about 8 to about 13 inches, about 5 to about 10 inches, and about 0.5 to about 3 inches, respectively. In another aspect, the charging device has a length of about 10 to about 12 inches, a width from about 7 to about 9 inches, and a height from about 1 to about 2 inches.

Charging device 300 further includes an AC cable 302 to connect to a power source (e.g. external power source 104) and provide the AC power input to the power circuitry within the housing 310. In an aspect, as seen in FIG. 3, the AC cable 302 can attach to the charging device 300 via a back side surface 312 of the charging device. In another aspect the AC cable can attach to the charging device at any location of the charging device 300, such as at another side surface, the top surface, or the bottom surface. In addition, the AC cable can be removable. In other words, the AC cable 302 can be configured to attach and detach from the charging device 300. In an aspect, the AC cable can retract into the housing 310 around a retraction pulley (not shown). For example, the AC cable 302 can be a self-retracting cable. The AC cable can be any suitable length and width to facilitate connecting the charging device 300 to a power source and to receive AC power. In an aspect, the AC cable has a length of about 1 meter to about 3 meters. In another aspect, the AC cable has a length from about 1.5 meters to about 2 meters.

Charging device 300 further includes a DC cable 318. The DC cable can connect to a device and provide DC power output generated by the charging device 300 to the device. For example, the DC cable 318 can connect to a portable computer and provide power to the portable computer. As seen in FIG. 3, the DC cable 318 can attach to the charging device via a side surface 312 opposite the side surface at which the AC cable is attached. In other aspects, the DC cable 318 can attach to the charging device 300 at any location. In an aspect, the DC cable can retract into the housing 310 around a retraction pulley 308. For example, the DC cable 318 can be a self-retracting cable. The DC cable 318 can rest in a fully retracted state in a cavity or opening 316 located on a side surface 312 of the housing 310. The DC cable can be any suitable length and width to facilitate connecting the charging device 300 to a remote device (e.g. a laptop computer). In an aspect, the DC cable has a length of about 1 meter to about 3 meters. In another aspect, the DC cable has a length from about 1.5 meters to about 2 meters. In an aspect, the DC cable 318 has bi-directional power transfer capabilities. In other words, the DC cable 318 can allow for bi-directional power flow of DC current such that the DC cable can provide power to a device connected to either end of the DC cable and receive power from a device connected to either end of the DC cable 318.

The charging device 300 further includes a charging surface 306 on the top surface 320 of the charging device. The charging surface can be established via a wireless charging component (e.g. wireless charging component 110) located within the housing. For example, the charging surface can be established via one or more primary induction coils located beneath the top surface 320 of the housing and connected to a power source of the wireless charging component. Although the charging surface 306 is depicted as a rectangular area with dimensions less than the full top surface 320 of the charging device, it should be appreciated that the charging surface 306 is not limited to a specific configuration, size, and/or area of the charging device 300. For example, in an aspect, the charging surface 306 can encompass substantially the entire top surface of the housing 310.

In addition, the charging device 300 can include two USB ports 314. The USB ports can be located on a side surface 312 of the charging device. As seen in FIG. 3, the USB ports are located side by side on a same surface of the charging device as the DC cable 318. However, in other aspects, the USB ports can be located anywhere on the charging device. For example, one USB port can be located on a back side surface and one USB port can be located on a side surface adjacent to the back side surface. Further, in other aspects, the charging device may include no USB ports, one USB port, or more than two USB ports. Further, the charging device 300 can include a light 304. The light can be located on the top surface 320 of the charging device or at any other location on the charging device. In an aspect, the light can provide backlighting and/or indicate when the charging device 300 is charging another device.

While the methods described within this disclosure are illustrated in and described herein as a series of acts or events, some acts may occur in different orders and/or concurrently with other acts or events apart from those illustrated and/or described herein. In addition, not all illustrated acts may be required to implement one or more aspects or embodiments of the description herein. Further, one or more of the acts depicted herein may be carried out in one or more separate acts and/or phases.

Figure 4:
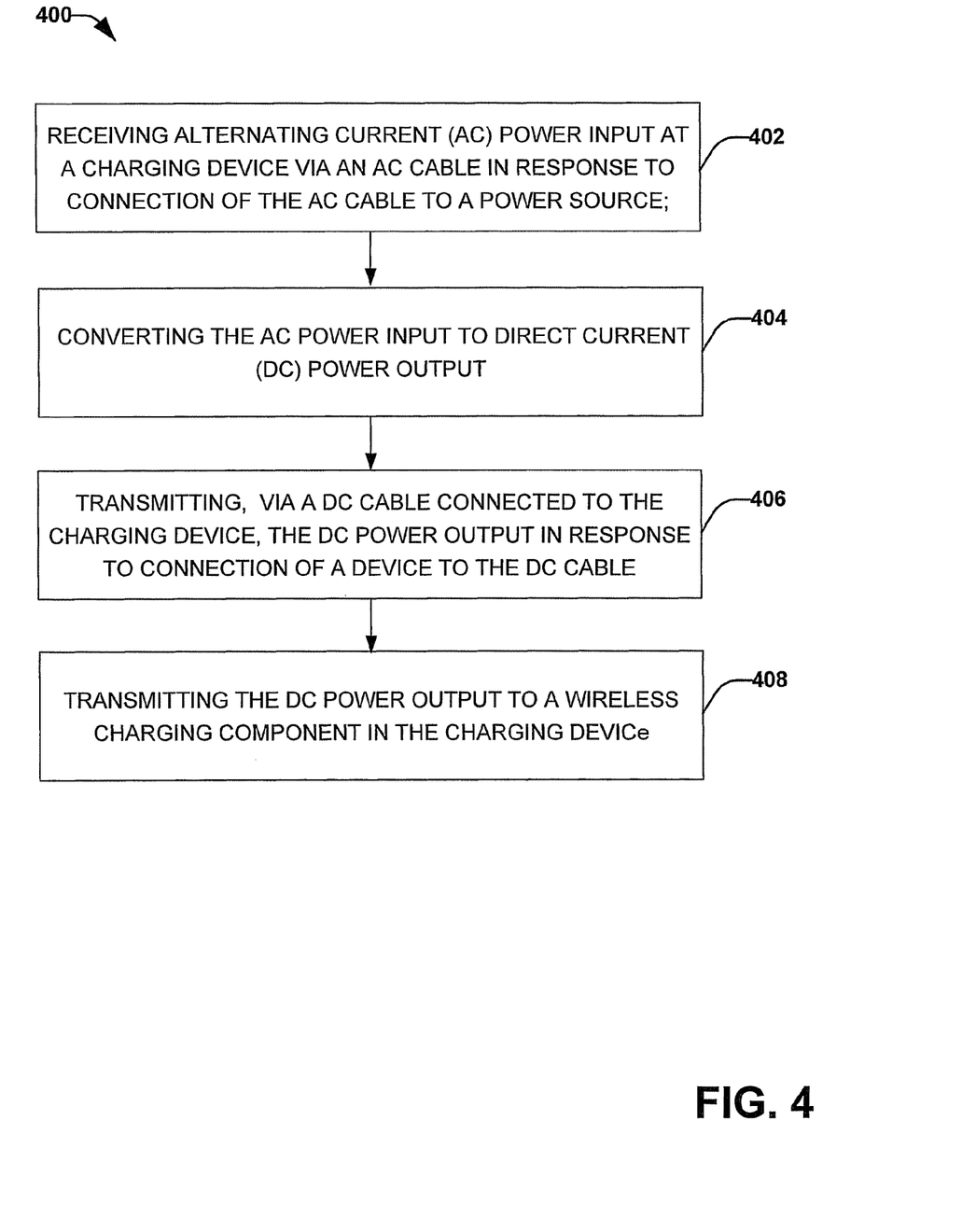
FIG. 4 presents a methodology for charging one or more devices with a charging device having wired and wireless charging capabilities.

An example methodology 400 for charging one or more devices using a charging device as described herein is presented in FIG. 4. Reference is made to the figures described above for ease of description. However, the method 400 is not limited to any particular embodiment or example provided within this disclosure.

At 402, alternating current (AC) power input is received at a charging device via an AC cable in response to connection of the AC cable to a power source. At 404 the AC power input is converted into to direct current (DC) power output. (e.g. using power circuitry 108). At 406, the DC power output is transmitted, via a DC cable connected to the charging device, in response to connection of a device to the DC cable. Further, at 408, the DC power output is also transmitted to a wireless charging component in the charging device.

Figure 5:
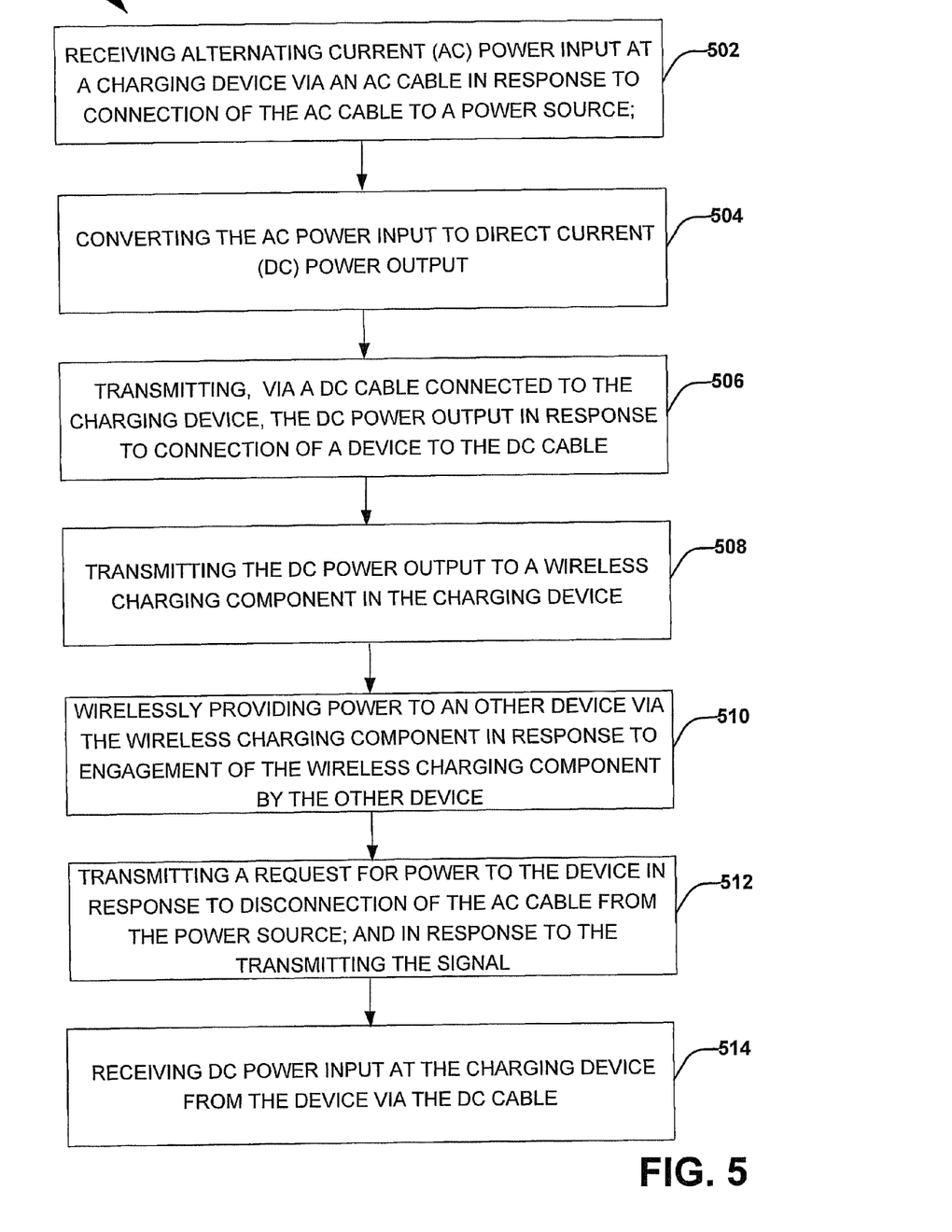
FIG. 5 presents another methodology for charging one or more devices with a charging device having wired and wireless charging capabilities.

Another example methodology 500 for charging one or more devices using a charging device as described herein is presented in FIG. 5. Reference is made to the figures described above for ease of description. However, the method 500 is not limited to any particular embodiment or example provided within this disclosure.

At 502, alternating current (AC) power input is received at a charging device via an AC cable in response to connection of the AC cable to a power source. At 504 the AC power input is converted into to direct current (DC) power output. (e.g. using power circuitry 108). At 506, the DC power output is transmitted, via a DC cable connected to the charging device, in response to connection of a device to the DC cable. Further, at 508, the DC power output is also transmitted to a wireless charging component in the charging device. At 510, the charging device wirelessly provides power to another device via the wireless charging component in response to engagement of the wireless charging component by the other device. At 512, a request for power is transmitted to the device in response to disconnection of the AC cable from the power source. Further at 514, in response to the transmitting the signal, the charging device receives DC power input from the device via the DC cable.

Many variations and modifications can be made to the above-described examples. All such modifications and variations are intended to be included herein within the scope of the disclosure and protected by the following claims. It will be noted that the singular forms "a," "an," and "the" include plural references unless the context clearly indicates otherwise.

What is claimed is:

1. An apparatus, comprising:
a housing defining an internal compartment to house power circuitry that converts alternating current (AC) power input to direct current (DC) power output, and a wireless charging component that wirelessly provides power to a first device;
an AC cable to connect to a power source and provide the AC power input to the power circuitry;
a DC cable to connect to a second. device and provide the DC power output from the power circuitry within the housing to the second device, wherein the second device is external to the apparatus; and
a power control circuit to determine when the AC power cable does not provide the AC power input to the power circuitry, and in response, direct the DC power cable to provide DC power input to the power circuitry from a power source associated with the second device.

2. The apparatus of claim 1, further comprising:
a charging surface located on a surface of the housing, wherein the wireless charging component wirelessly provides power to the first device via electromagnetic induction when the first device is engaged at the charging surface.

3. The apparatus of claim 1, wherein the DC power cable is retractable into the internal compartment.

4. The apparatus of claim 1, further comprising,:
a universal serial bus (USB) port to provide the DC power output to a third device connected thereto.

5. A charging method, comprising:
upon connection of a first device to a charging. device to receive power from the charging device via a DC cable, and when no power input is received by the charging device via an AC cable, transmitting a request for power to the first device:
in response to the request, receiving DC power input at the charging device from the first device via the DC cable, wherein receiving the DC power input at the charging device comprises receiving power communicated via the DC cable from a location external to the charging device to a location inside the charging device; and
transmitting the received DC power to a wireless charging, component.

6. The charging method of claim 5, further comprising:
wirelessly providing power to a second device via the wireless charging component in response to engagement of the wireless charging component by the second device.

7. The apparatus of claim 1, wherein the power control circuit is to send a request to the second device for DC power.

8. The charging method of claim 5, further comprising:
providing a first portion of the received DC power to a first wireless device in response to engagement al the wireless charging component by the first wireless device.

9. The charging method of claim 5, further comprising:
providing a second portion of the received DC power to a second wireless device in response to engagement of the wireless charging component by the second wireless device.

10. A charging method, comprising:
upon connection of a first device to a charging device to receive power from the charging device via a DC cable, and when no power input is received by the charging device via an AC cable, transmitting a request for power to the first device;
in response to the request, receiving DC power input at the charging device from the first device via the DC cable;
transmitting the received DC power to a wireless charging component;
providing a first portion of the received DC power to a first wireless device in response to engagement of the wireless charging component by the first wireless device; and
providing a second portion of the received DC power to a second wireless device in response to engagement of the wireless charging component by the second wireless device.

* * * * *

UNITED STATES PATENT AND TRADEMARK OFFICE
CERTIFICATE OF CORRECTION

| | | |
|---|---|---|
| PATENT NO. | : 9,490,648 B2 | Page 1 of 1 |
| APPLICATION NO. | : 13/460138 | |
| DATED | : November 8, 2016 | |
| INVENTOR(S) | : Jamie Sookprasong et al. | |

It is certified that error appears in the above-identified patent and that said Letters Patent is hereby corrected as shown below:

In the Claims

In Column 9, Line 49 approx., in Claim 1, delete "second. device" and insert -- second device --, therefor.

In Column 10, Line 6 approx., in Claim 4, delete "comprising,:" and insert -- comprising: --, therefor.

In Column 10, Line 10 approx., in Claim 5, delete "charging. device" and insert -- charging device --, therefor.

In Column 10, Line 13 approx., in Claim 5, delete "device:" and insert -- device; --, therefor.

In Column 10, Line 21-22 approx., in Claim 5, delete "charging, component" and insert -- charging component --, therefor.

In Column 10, Line 33 approx., in Claim 8, delete "al the" and insert -- of the --, therefor.

Signed and Sealed this
Second Day of May, 2017

Michelle K. Lee
*Director of the United States Patent and Trademark Office*